(12) United States Patent
Kondo et al.

(10) Patent No.: US 6,447,155 B2
(45) Date of Patent: Sep. 10, 2002

(54) DOUBLE-STACKED TYPE LAMP UNIT FOR THE VEHICLE

(75) Inventors: Toshiyuki Kondo; Hidetaka Okada, both of Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/785,517

(22) Filed: Feb. 16, 2001

(30) Foreign Application Priority Data

Feb. 18, 2000 (JP) ......................................... 2000-041961

(51) Int. Cl.[7] ................................................ F21V 21/00
(52) U.S. Cl. ...................... 362/545; 362/236; 362/240; 362/517
(58) Field of Search ................................ 362/543, 544, 362/545, 517, 518, 511, 234, 235, 236, 240, 328, 247, 245

(56) References Cited

U.S. PATENT DOCUMENTS 4,680,678 A * 7/1987 Iwaki ........................... 362/235
6,097,549 A 8/2000 Jenkins et al. ................ 359/726
6,238,073 B1 * 5/2001 Ito et al. ....................... 362/236

* cited by examiner

*Primary Examiner*—Sandra O'Shea
*Assistant Examiner*—John Anthony Ward
(74) *Attorney, Agent, or Firm*—Weingarten, Schurgin, Gagnebin & Lebovici LLP

(57) ABSTRACT

A double-stacked type lamp unit for a vehicle comprising an LED lamp unit using an LED lamp as the light source and having a reflecting surface for the LED, and an incandescent lamp unit using an incandescent lamp as the light source and having a reflecting surface for the incandescent lamp, is configured so that the reflecting surface for the LED is formed partially optically transparent, and the incandescent lamp and the reflecting surface for the incandescent lamp are arranged on a back surface of this reflecting surface for the LED. The LED lamp unit and the incandescent lamp unit are therefore coupled to each other in a manner that the reflecting surfaces are stacked, whereby the combination of the lamp units may display as a different lamp color.

11 Claims, 3 Drawing Sheets

DOUBLE-STACKED TYPE LAMP UNIT FOR THE VEHICLE

BACKGROUND OF THE INVENTION

1. Field of the Invention

The present invention relates to a lamp unit for a vehicle, and more particularly to the lamp unit for the vehicle designed to arrange in a manner to stack two units so as to be able to perform two indications by using one indication surface and the object of the invention is to provide the new constitution of the lamp unit for the vehicle.

2. Detailed Description of the Prior Art

FIG. 7 shows an example of the constitution of this kind of lamp unit 90 for the vehicle performing two indications. When making it share both functions of a tail lamp and a stop lamp by using one indication surface, for example, two light source of a bulb 93 for the tail lamp and a bulb 94 for the stop lamp are installed within a lamp body constituted by a lens 91 colored on a red or the like and a reflecting mirror 92 in advance, whereby the light source is switched in accordance with the purpose.

Moreover, in this case, since an emitted light color as the lamp unit for the vehicle becomes the color colored on the lens 91 when lighting up the bulb 93 for the tail lamp and also when lighting up the bulb 94 for the stop lamp, significantly different bulbs in light intensity have been used for the bulb 93 for the tail lamp and the bulb 94 for the stop lamp in order to identify the indication for the tail lamp from that for the stop lamp.

Moreover, an electric bulb with double-filaments in which filaments for the bulb 93 for the tail lamp and the bulb 94 for the stop lamp are mounted within one bulb conventionally has been used from the viewpoint of focusing of the reflecting mirror 92 or the like.

However, there has been a problem that in the lamp unit for the vehicle of the prior constitution described above, first, since the emitted light color of the indication becomes same primarily, only the same lamp units for the vehicle with the same emitting-light color can be combined each other as are the tail lamp and stop lamp described-above for instance, as a result, practices are limited extremely.

Moreover, secondly, there has caused problem that the function of the side of a more dark indication is lost due to masking since the light source with higher intensity will be lit up at the time of switching the indication, discussing the condition of the indication according to the lamp unit for the vehicle 90 of the prior example in detail so that the indication which should be indicated at all time can not be combined with other lamp, and the practices are limited extremely in this viewpoint.

SUMMARY OF THE INVENTION

The present invention can solve the problems by providing a double-stacked type lamp unit for the vehicle as specified means for solving the prior problems described above, comprising:

- a LED lamp unit using a LED lamp as the light source and having a reflecting surface for LED; and
- an incandescent lamp unit using the incandescent lamp as the light source and having a reflecting surface for the incandescent lamp, wherein said reflecting surface for LED is formed optically transparent partially, and this incandescent lamp and the reflecting surface for the incandescent lamp are arranged on a back surface of this reflecting surface for LED, and said LED lamp unit and the incandescent lamp unit are coupled each other in a manner that the reflecting surfaces are stacked.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
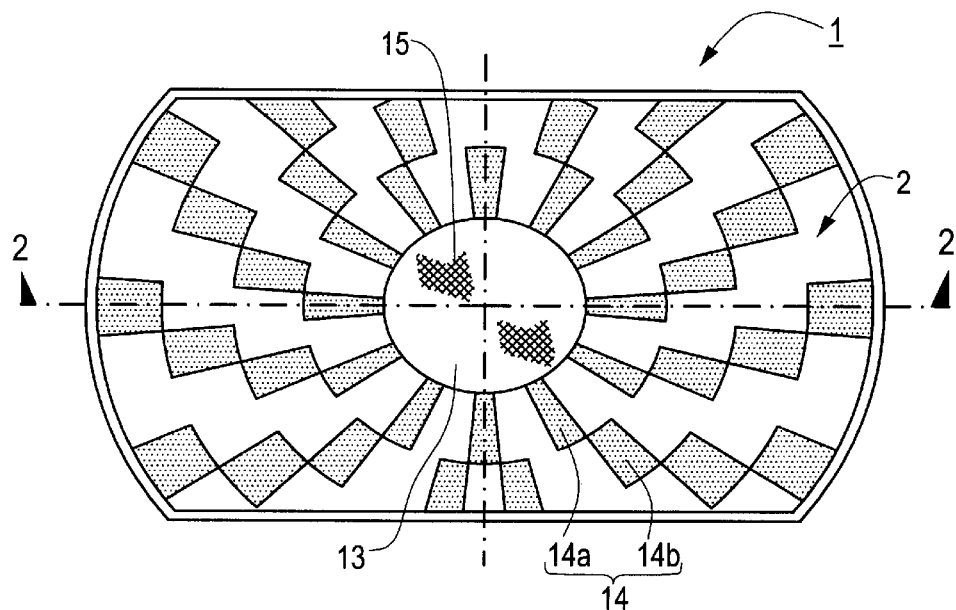
FIG. 1 is a front elevation showing a first embodiment of a double-coupling type lamp for a vehicle according to the invention.
Figure 2:
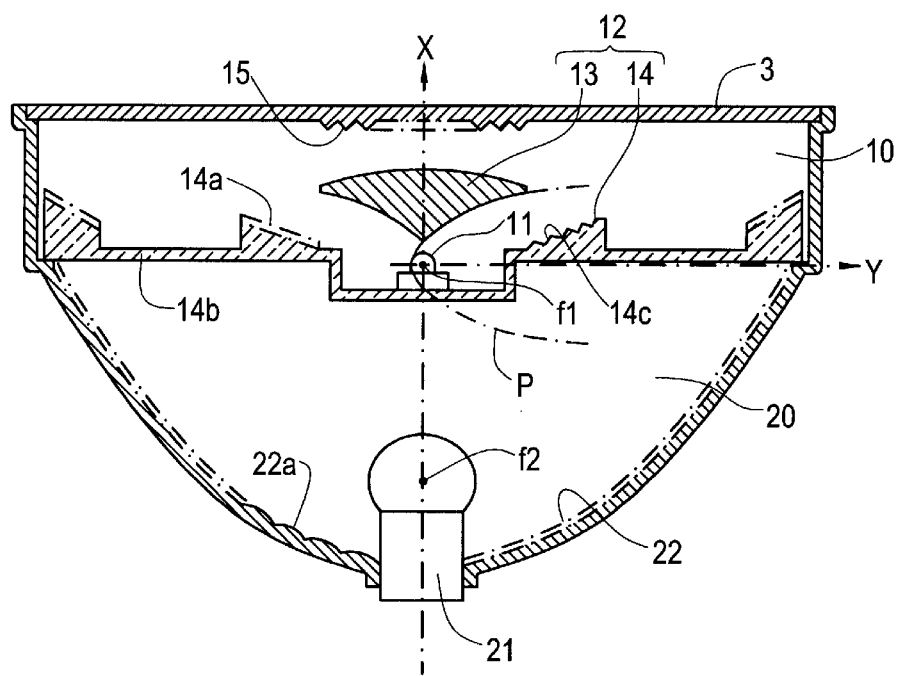
FIG. 2 is a cross section along line 2—2 in FIG. 1.

Secondly, the invention will be described in detail based on embodiments shown in the drawings. A first embodiment according to the invention are shown in FIG. 1 and FIG. 2, and a reference character 1 in the drawings shows a double-coupling type lamp unit for a vehicle according to the invention. Moreover, this double-stacked type lamp unit for the vehicle 1 (hereinafter abbreviated as a lamp unit 1) is constituted by coupling two lamp units, a LED lamp unit 10 and an incandescent lamp unit 20 each other in series, that is, in a manner to be stacked so as to share a light-emitting surface 2. Moreover, a reference character 3 in the drawings shows an outer lens which is shared by two lamp units.

Here, first, a constitution of the LED lamp unit 10 will be described below. In this LED lamp unit 10, a LED lamp 11 (or may be a very small-sized electric bulb) which is a small-sized light-emitting source is used as the light source, the LED lamp 11 is arranged on the position and in the direction which a main light-emitting direction is 2 is made to approximately align with an illuminating axis X of the double-stacked type lamp unit for the vehicle 1.

The reflecting surface 12 for LED 10 is provided corresponding to said LED lamp 11, and this reflecting surface 12 for LED 10 is constituted by a first LED reflecting surface 13 and a second LED reflecting surface 14, in addition, said second LED reflecting surface 14 is constituted by a reflecting portion 14a and a base portion 14b.

Said first LED reflecting surface 13 is a paraboloid obtained by rotating a parabola P of which focus f1 is made to align with said LED lamp 11 and an axis Y is made to intersect at approximately right angle with said illuminating axis X, taking the illuminating axis X as an axis, and it has been selected the paraboloid producing the LED lamp 11 on the side of the illuminating direction, of two pieces of paraboloid obtained as described above.

The first LED reflecting surface 13 formed as described above would emit the light from said LED lamp 11 as parallel light beams within the range of 360° in the direction intersecting at approximately right angle with said illuminating direction X. Moreover, said axis Y is not necessarily required to strictly intersect at right angle to said illuminating axis X, and in this case, an inclination corresponding to the base portion 14b of the second LED reflecting surface 14 which will be described later has only to provide.

Moreover, the reflecting portion 14a of said second LED reflecting surface 14 changes the direction of the light from said first LED reflecting surface 13 to the illuminating axis X, therefore, in principle, it is set at an elevation angle 45° of a plane mirror. Moreover, it can be performed freely that a supplementary cut 14c combined with a small reflecting surface with the elevation angle 45° is formed to vary an area of the respective reflecting portion 14a if required at the time of design of the lamp unit 1 and so forth. Furthermore, appropriate diffusing characteristic may be provided on this supplementary cut 14c to form a light emitting and a light-distribution characteristic and so forth.

Moreover, said reflecting portion 14a is designed to arrange on the base portion 14b formed into the form of a plate by integrally molding, for example, to receive the light from the first LED reflecting surface 13. Here, since the incandescent lamp unit 20 is arranged on a back surface of the base portion 14b as will be described later, the base portion 14b is formed with a transparent member basically. Therefore, the reflecting portion 14a integrally formed is formed by selective vacuum evaporation of aluminum.

In this case, the reflecting portion 14a on the base portion 14b may be arranged in the form of a circumference in equidistance from said first LED reflecting surface 13, or it may be arranged merely at random in distance or so as to form patterns, in addition, the reflected light becoming the parallel light beam which the first LED reflecting surface 13 produces may be divided in a direction of the illuminating axis X to make to reflect in a multi stage on the same emitting line (refer to FIG. 2).

Said incandescent lamp unit 20 is constituted providing the incandescent lamp 21 and the reflecting surface for the incandescent lamp 22 as main components, and said incandescent lamp 21 is provided in the same axis with said LED lamp 11, that is, in a manner to approximately align with the illuminating axis X. Moreover, a basic constitution of the reflecting surface for the incandescent lamp 22 is a paraboloid of revolution taking the incandescent lamp 21 as a focus f2 and taking the illuminating axis X as the rotating axis, and reflects the light from the incandescent lamp 21 as a parallel light with the illuminating axis X.

Moreover, also in this reflecting surface for the incandescent lamp 22, a diffusion cut 22a or the like for purpose to form the light-distribution characteristic as the lamp unit 1 and so forth can be provided freely, and in addition, the diffusion cut also can be given on the base portion 14b freely in the place of the reflecting surface for the incandescent lamp 22.

As described above, the LED lamp unit 10 provided in the same axis with the incandescent lamp unit 20 and are stacked, whereby according to the lamp unit 1 of the invention, the reflecting portion 14a is viewed brightly when lighting up the LED lamp unit 10, the reflecting surface for the incandescent lamp 22 is viewed brightly via the base portion 14b when lighting up the incandescent lamp unit 20, and both of the reflecting portion 14a and the reflecting surface for the incandescent lamp 22 are viewed brightly when lighting up both lamps.

Therefore, when forming the base portion 14b with amber transparent material and using a red light emitting LED as the LED lamp 11, the function is performed as the tail lamp when lighting up the side of the LED lamp unit 10, the function is performed as a turn signal lamp when lighting up the side of the incandescent lamp unit 20 intermittently, and both functions are performed when lighting up both lamps, for example.

According to the constitution described above, the direct light from the incandescent lamp 21 would be shielded by the LED lamp 11 and the first LED reflecting surface 13, whereby a part of the incandescent lamp 21 can be prevented from being viewed brightly irregularly when lighting up the side of the incandescent lamp unit 20 and a fine view also can be improved at lighting up.

Since 15 in FIG. 1 and FIG. 2 shows a reflex-reflector in front of the first LED reflecting surface 13, cannot be viewed brightly even when lighting up either the LED lamp unit 10 or the incandescent lamp unit 20 as is apparent from the above-described description. Therefore, although the ornament can be placed on this portion freely, but the reflex-reflector 15 which should be mounted in the case where the lamp unit 1 is a lamp for the rear of a vehicle, is provided on this portion by utilizing said outer lens 3 and so forth, thereby to be effective for size reduction of the lamp unit 1.

Figure 3:
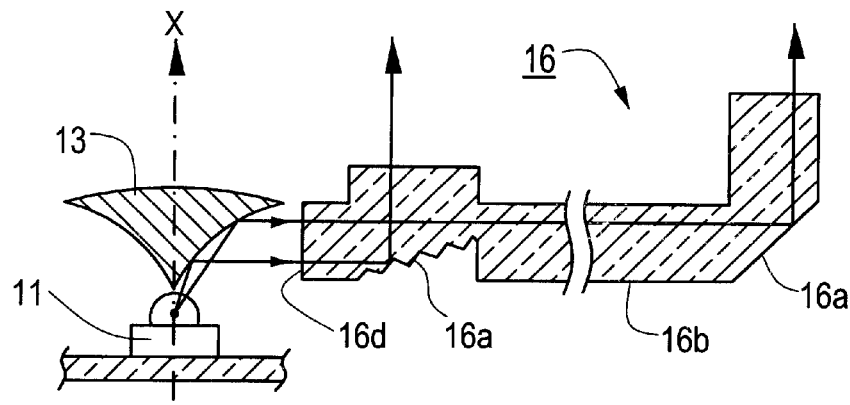
FIG. 3 is a cross section showing in component parts a second embodiment of a double-coupling type lamp for a vehicle according to the invention.
Figure 4:
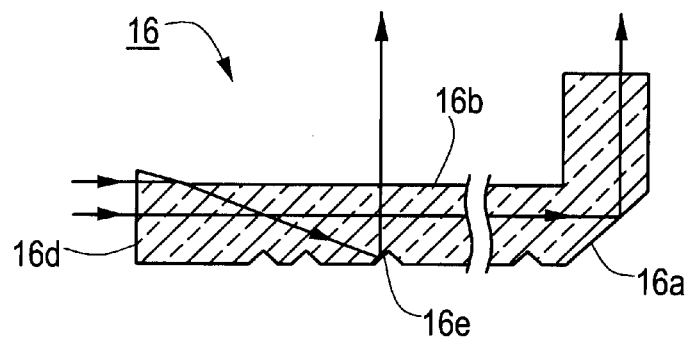
FIG. 4 is a cross section of component parts showing further embodiment of the second embodiment.

FIG. 3 and FIG. 4 are views showing component parts of a second embodiment according to the invention, and the base portion 14b transmits the light from the incandescent lamp unit 20, as well as holds the reflecting portion 14a in the first embodiment described above, on the one hand, the base portion 16b of the second LED reflecting surface 16 holds the reflecting portion 16a, as well as serves to transmit the reflected light from the first LED reflecting surface 13 to the reflecting portion 16a in this second embodiment.

Therefore, in a second embodiment, an opening portion 16d is provided on a center of the base portion 16b, and the light from the first LED reflecting surface 13 is introduced into the base portion 16b through a plane of a plate thickness direction of this opening portion 16d, thereby an action as a light guide plate to be performed. Moreover, the reflecting portion 16a based on total reflection in the inner surface in which a difference in refractive indexes between the base portion 16b and the atmosphere is utilized is provided on an appropriate position including an outer periphery of said base portion 16b, thereby a traveling direction of the light to be changed to the direction of said illuminating axis X.

Moreover, said reflecting portion may be a reflecting portion 16e formed into a conical hole with a small diameter as shown in FIG. 4, and in this case, since a bright point appears corresponding with the reflecting portion 16e, the number and pattern which the reflecting portion 16e is arranged are appropriately formed, whereby characters and graphics or the like written freely can be indicated depending upon a group of the bright points described above. Moreover, in this case, the light on the plane of the side on which the reflecting portion 16e of this base portion 16b is formed is gathered by devising the shape of the base portion 16b of the vicinity of said opening portion 16d, whereby the brightness can be increased more and more.

Figure 5:
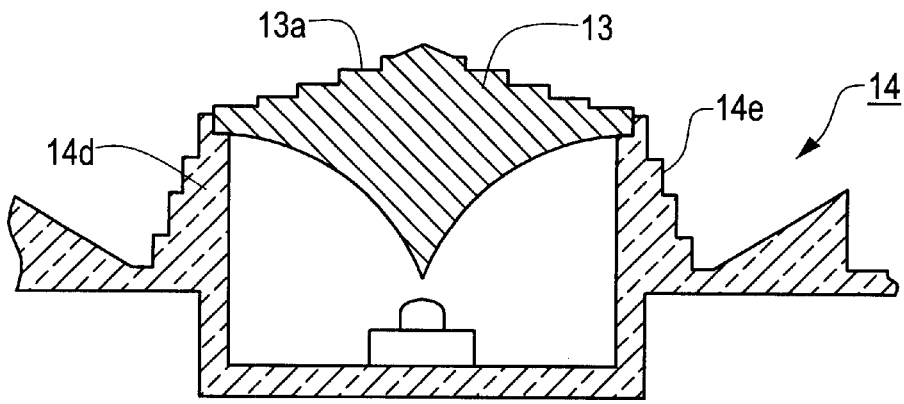
FIG. 5 is a front elevation showing in component parts the third embodiment of a double-coupling type lamp for a vehicle according to the invention.

FIG. 5 is a view showing component parts of a third embodiment according to the invention, and although the constitution of said second LED reflecting surface 14 is the same as the first embodiment basically, a cylindrical septum 14d surrounding the first LED reflecting surface 13 is provided, and the first LED reflecting surface 13 is held with a cylindrical septum 14d and so forth in a third embodiment. Moreover, the ornament cut 14e is provided on said cylindrical septum 14d, and unification of design are realized with the ornament cut 13e provided on the first LED reflecting surface 13, the fine view also is designed to be improved. Moreover, although it is needless to say, the ornament cut 14e provided on said septum 14d can be changed freely, and in this case, the ornament cut 13a on the first LED reflecting surface 13 may be omitted.

Figure 6:
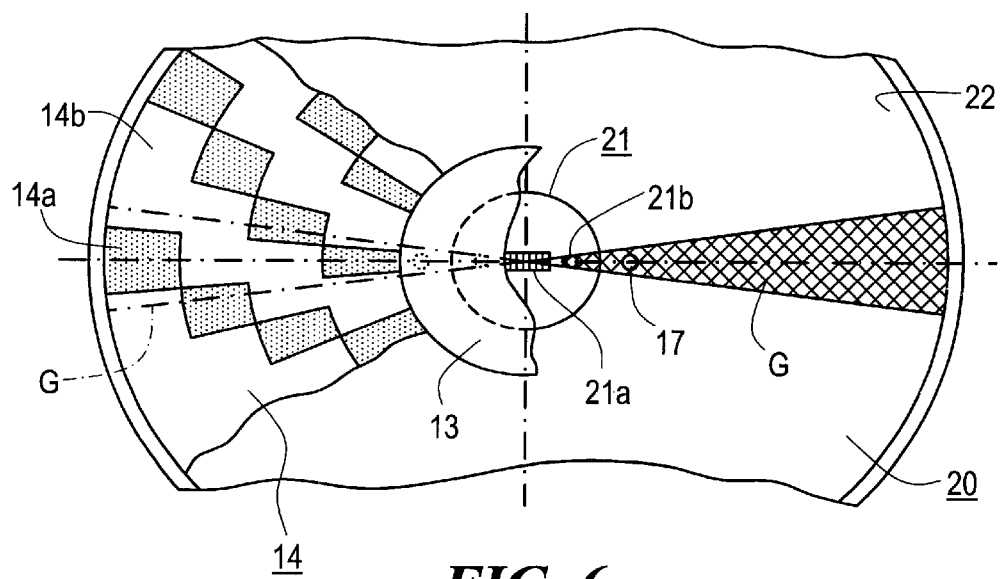
FIG. 6 is an illustration showing in component parts the third embodiment of a double-coupling type lamp for a vehicle according to the invention.
Figure 7:
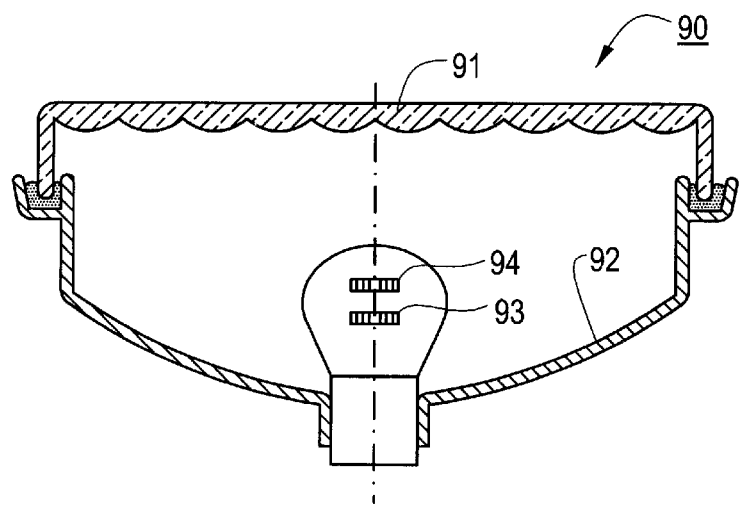
FIG. 7 is a cross section showing a prior example.

FIG. 6 is a view schematically showing a fourth embodiment according to the invention, and, generally, a shadow G of a stem 21b for putting a filament 21a on the reflecting surface for the incandescent lamp 22 tends to occur in the incandescent lamp unit 20 using the incandescent lamp 21 as the light source. Moreover, since the LED lamp unit 10 is stacked in front of an illuminating direction of the incandescent lamp unit 20 in the invention, a wire harness 17 for lighting up this LED lamp unit 10 also should be installed within the incandescent lamp unit 20, and accordingly, this wire harness 17 also becomes a factor of an occurrence of the shadow G.

Accordingly, since said wire harness 17 is provided within the shadow G of the stem 21b in a fourth embodiment, an occurrence of a new shadow on the reflecting surface for the incandescent lamp 22 can be prevented, whereby the fine view can be improved at lighting up. In addition, in this fourth embodiment, the reflecting portion 14a provided on the base portion 14b is constituted so as to match with a portion corresponding to said shadow G, whereby the occurrence of the shadow G becomes hard to recognize.

As described above, the double-stacked type lamp unit for the vehicle comprising: a LED lamp unit using a LED lamp as the light source and having a reflecting surface for LED; and an incandescent lamp unit using the incandescent lamp as the light source and having a reflecting surface for the incandescent lamp, wherein said reflecting surface for LED is formed optically transparent partially, and this incandescent lamp and the reflecting surface for the incandescent lamp are arranged on a back surface of this reflecting surface for LED, and said LED lamp unit and the incandescent lamp unit are coupled each other in a manner that the reflecting surfaces are stacked is constituted according to the invention, whereby first, the lamp for the vehicle capable of realize an unprecedented novel appearance and a lighting condition can be provided and extremely excellent effects can be performed for improvement of an appeal as a commodity.

Moreover, secondly, a combination of the lamp units different in lamp color which has been impossible heretofore, such as the tail lamp (red) and the turn signal lamp (amber) can be combined has been made possible, and flexibility for design of a rear-combination lamp or the like can be given, whereby extremely excellent effects also can be performed for improvement in performance such as improvement of notifying function to the externals such as succeeding vehicle is improved, for example.

While the presently preferred embodiments of the present invention has been shown and described, it will be understood that the present invention is not limited thereto, and that various changes and modifications may be made by those skilled in the art without departing from the scope of the invention as set forth in the appended claims.

What is claimed is:

1. A double-stacked type lamp unit for the vehicle comprising:
    an LED lamp unit using a LED lamp as a light source and having a reflecting surface for LED; and
    an incandescent lamp unit using the incandescent lamp as a light source and having a reflecting surface for the incandescent lamp,
    wherein said reflecting surface for the LED is partially optically transparent, and this incandescent lamp and the reflecting surface for the incandescent lamp are arranged on a back surface of this reflecting surface for LED, and said LED lamp unit and the incandescent lamp unit are coupled each other in a manner that the reflecting surfaces are stacked relationship.

2. The double-stacked type lamp unit for the vehicle according to claim 1, wherein:
    the LED lamp has a main light-emitting direction which is approximately aligned with an illuminating direction of the lamp unit for the vehicle; and
    a reflecting surface for LED includes
    a first LED reflecting surface which reflects radiately over 360° and at right angle with said illuminating direction, and
    a second LED reflecting surface comprising a reflecting portion arranged in a ring-shape and equidistant from the first LED reflecting surface and reflecting light from said first LED reflecting surface to said illuminating direction and a base portion holding the reflecting portion and transmitting the light from the incandescent lamp unit.

3. The double-stacked type lamp unit for the vehicle according to claim 2, wherein said base portion is formed with a transparent member providing a light-guide function transmitting the light from said first LED reflecting surface up to said base portion by internal transmission.

4. The double-stacked type lamp unit for the vehicle according to claim 2, further including a septum portion surrounding the first LED reflecting surface between said first LED reflecting surface and said second LED reflecting surface of said reflecting surface for the LED.

5. The double-stacked type lamp unit for the vehicle according to claim 2, wherein ornamental lens cut is provided on at least one of said first LED reflecting surface, said septum portion and said reflecting portion of said reflecting surface for the LED.

6. The double-stacked type lamp unit for the vehicle according to claim 1, wherein said incandescent lamp is covered so as to avoid direct view at said LED lamp of said LED lamp unit and said first LED reflecting surface.

7. The double-stacked type lamp unit for the vehicle according to any of claim 1, wherein at least one of said reflecting surface for LED and said reflecting surface for the incandescent lamp forms a light-distribution characteristic with the reflecting surface self.

8. The double-stacked type lamp unit for the vehicle according to claim 1, further including a stem of said incandescent lamp and a feeding lead for feeding electric power to said LED lamp casting a shadow on a position overlapped with each other where the light from said incandescent lamp reaches said reflecting surface for the incandescent lamp.

9. The double-stacked type lamp unit for the vehicle according to claim 1, wherein said second LED reflecting surface of said reflecting surface for LED is provided to correspond to where the shadows of the stem and said feeding lead occur when the light from said incandescent lamp is reflected by said reflecting surface for the incandescent lamp.

10. The double-stacked type lamp unit for the vehicle according to claim 1, wherein said LED lamp and said first LED reflecting surface are shielded by a reflex-reflector provided on a front side of an illuminating direction of the lamp unit to this first LED reflecting surface.

11. The double-stacked type lamp unit for the vehicle according to claim 4, wherein:

an ornamental lens cut is provided on at least one of said first LED reflecting surface, said septum portion and said reflecting portion of said reflecting surface for the LED;

said incandescent lamp is covered so as to avoid a direct view at said LED lamp of said LED lamp unit and said first LED reflecting surface;

at least one of said reflecting surface for LED and said reflecting surface for the incandescent lamp forms a light-distribution characteristic with the reflecting surface itself;

further including a stem of said incandescent lamp and a feeding lead for feeding electric power to said LED lamp casting a shadow on a position overlapped with each other where the light from said incandescent lamp reaches said reflecting surface for the incandescent lamp;

wherein said second LED reflecting surface of said reflecting surface for the LED is provided to correspond to where the shadows of the stem and said feeding lead occur when the light from said incandescent lamp is reflected by said reflecting surface for the incandescent lamp;

said LED lamp and said first LED reflecting surface are shielded by a reflex-reflector provided on a front side of an illuminating direction of the lamp unit to this first LED reflecting surface.

* * * * *

UNITED STATES PATENT AND TRADEMARK OFFICE
CERTIFICATE OF CORRECTION

PATENT NO. : 6,447,155 B2
DATED : September 10, 2002
INVENTOR(S) : Toshiyuki Kondo et al.

It is certified that error appears in the above-identified patent and that said Letters Patent is hereby corrected as shown below:

Column 4,
Line 14, "13, cannot" should read -- 13, it cannot --;
Line 18, "freely, but the" should read -- freely, the --;

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,447,155 B2  
DATED : September 10, 2002  
INVENTOR(S) : Toshiyuki Kondo et al.

It is certified that error appears in the above-identified patent and that said Letters Patent is hereby corrected as shown below:

<u>Column 6,</u>
Line 5, "LED," should read -- the LED, --;
Line 7, "are stacked" should read -- are in a stacked --;
Line 13, "for LED" should read -- for the LED --;
Line 14, "radiately" should read -- radially --;
Line 44, "to any of claim 1," should read -- to claim 1, --;
Line 47 "self." should read -- itself. --; and
Line 57 "for LED" should read -- for the LED --.

Signed and Sealed this

First Day of June, 2004

JON W. DUDAS
*Acting Director of the United States Patent and Trademark Office*